(12) United States Patent
Roozen et al.

(10) Patent No.: US 11,477,989 B2
(45) Date of Patent: Oct. 25, 2022

(54) ACETATE POWDER AND METHOD FOR THE PREPARATION THEREOF

(71) Applicant: Purac Biochem B.V., Gorinchem (NL)

(72) Inventors: Lambertus Henricus Elisabeth Roozen, Gorinchem (NL); Gerrit Anthon Rene Hilhorst, Gorinchem (NL); Heny Kusumawardani, Papendrecht (NL); Apostolos Papageorgiou, Gorinchem (NL); Kees Van Der Voort Maarschalk, Ommen (NL)

(73) Assignee: PURAC BIOCHEM B.V., Gorinchem (NL)

( * ) Notice: Subject to any disclaimer, the term of this patent is extended or adjusted under 35 U.S.C. 154(b) by 344 days.

(21) Appl. No.: 16/868,295

(22) Filed: May 6, 2020

(65) Prior Publication Data

US 2020/0260748 A1 Aug. 20, 2020

Related U.S. Application Data

(63) Continuation of application No. PCT/EP2018/080317, filed on Nov. 6, 2018.

(30) Foreign Application Priority Data

Nov. 7, 2017 (EP) .................................... 17200361

(51) Int. Cl.
| | | |
|---|---|---|
| A23P 10/40 | (2016.01) | |
| A23B 4/20 | (2006.01) | |
| A23L 13/40 | (2016.01) | |
| A23P 20/18 | (2016.01) | |
| A23B 4/12 | (2006.01) | |
| A23L 2/68 | (2006.01) | |

(52) U.S. Cl.
CPC .................. *A23B 4/20* (2013.01); *A23B 4/12* (2013.01); *A23L 2/68* (2013.01); *A23L 13/428* (2016.08); *A23P 20/18* (2016.08); *A23V 2002/00* (2013.01)

(58) Field of Classification Search
CPC .......... A23P 20/18; A23P 10/40; A23P 10/30; A23L 29/035; A23L 2/68; A23L 13/428; A23B 4/12
See application file for complete search history.

(56) References Cited

U.S. PATENT DOCUMENTS

| | | |
|---|---|---|
| 2,768,095 A | 10/1956 | Tadema et al. |
| 5,788,990 A | 8/1998 | Akamatsu et al. |
| 2008/0317921 A1 | 12/2008 | Bontenbal |
| 2012/0142531 A1* | 6/2012 | Mazeaud ................. C05G 5/30 435/243 |
| 2013/0171314 A1 | 7/2013 | Campano et al. |
| 2013/0259998 A1 | 10/2013 | Anagnostou et al. |

FOREIGN PATENT DOCUMENTS

| | | |
|---|---|---|
| BE | 1020864 A3 | 6/2014 |
| EP | 2 644 033 A1 | 10/2013 |
| FR | 2151076 A1 | 4/1973 |
| JP | H50-031053 A | 3/1975 |
| WO | WO-2008/006878 A1 | 1/2008 |

OTHER PUBLICATIONS

International Search Report dated Jul. 12, 2018 in corresponding International Application No. PCT/EP2018/080317, 4 pages.

* cited by examiner

*Primary Examiner* — Vera Stulii
(74) *Attorney, Agent, or Firm* — Sunit Talapatra; Foley & Lardner LLP

(57) ABSTRACT

The invention relates to a particulate product comprising at least 10 wt. % of the coated acetate particles having the following characteristics: (a) comprising one or more carrier particles containing at least 80 wt. % of sodium acetate component selected from sodium acetate hydrates, sodium acetate anhydrous and combinations thereof; (b) comprising a coating layer that covers the one or more carrier particles, said coating layer containing at least 60 wt. % of potassium acetate; (c) containing potassium and sodium in a molar ratio of 0.4:1 to 5:1; and (d) a particle size in the range of 40 to 1,000 μm. The coated acetate particles in the particulate product are very stable, even though the potassium acetate in the coating layer is in direct contact with the surrounding atmosphere. The particulate product can suitably be used in the preparation of foodstuffs and beverages.

19 Claims, No Drawings

ACETATE POWDER AND METHOD FOR THE PREPARATION THEREOF

CROSS-REFERENCE TO RELATED APPLICATIONS

This application is a continuation of International Application No. PCT/EP2018/080317, filed Nov. 6, 2018, which claims the benefit of and priority to European Application No. 17200361.8, filed Nov. 7, 2017, both of which are hereby incorporated by reference herein in their entireties.

TECHNICAL FIELD OF THE INVENTION

The invention relates to a stable acetate powder, more particularly to an acetate powder that is composed of coated acetate particles comprising one or more carrier particles containing sodium acetate and a coating layer containing potassium acetate. The acetate powder of the present invention is easy to handle (free flowing) and exhibits high stability.

The invention also relates to blends of the aforementioned acetate powder and other particulate ingredients. In addition, the invention relates to the use of the acetate powder and of blends containing said acetate powder in the preparation of foodstuffs or beverages. Finally, the invention provides a process for the manufacture of the acetate powder.

BACKGROUND OF THE INVENTION

Potassium acetate can be prepared by the reaction of acetic acid with a potassium-containing base such as potassium hydroxide or potassium carbonate. Potassium acetate is used as a food additive as a preservative and acidity regulator. In the European Union, it is labeled by the E number E261. Potassium acetate is very hygroscopic.

Sodium acetate can be produced by the reaction of acetic acid with sodium carbonate, sodium bicarbonate or sodium hydroxide. Sodium acetate may be added to food as a seasoning. In the European Union, it is labeled by the E-number E262. It is often used to give potato chips a salt and vinegar flavor. Sodium acetate is less hygroscopic than potassium acetate.

U.S. 2008/0317921 describes a process for manufacturing a cooked meat product comprising combining an uncooked meat product with an organic acid salt and a latent acid, followed by cooking the meat product, the latent acid being a compound which does not show acidic properties when it is added to the uncooked meat product, but which is converted to a carboxylic acid with at least 3 carbon atoms under the conditions prevailing during the cooking of the meat product, the organic acid salt being selected from lactate salts, acetate salts, and combinations thereof.

U.S. 2013/0171314 describes an antimicrobial preservative composition for food products comprising: potassium lactate, potassium acetate, and sodium diacetate. The preservative composition can be formulated as an aqueous liquid with a solids content of between 20 wt. % and 80 wt. % or it can be formulated as a dry mix.

U.S. 2013/0259998 describes a foodstuff preservation composition comprising potassium acetate and alkali metal diacetate, wherein the weight ratio of potassium acetate: alkali metal diacetate ranges from 1.5 to 9:1. The foodstuff preservation composition is produced by adding potassium acetate and alkali metal diacetate, and optionally an anti-caking agent, to a vessel under an inert and dry atmosphere, followed by mixing until a homogeneous mixture of the compounds is obtained. The preservation composition is either used fresh or stored under dry, cool and inert conditions.

SUMMARY OF THE INVENTION

The inventors have developed a process that enables the production of a free flowing powder that is composed of acetate particles that contain a substantial amount of potassium acetate and that exhibits excellent stability. More particularly, the inventors have developed a method that enables the production of coated acetate particles having the following characteristics:

comprising one or more carrier particles containing at least 80 wt. % of sodium acetate component selected from sodium acetate hydrates, sodium acetate anhydrous and combinations thereof;

comprising a coating layer that covers the one or more carrier particles, said coating layer containing at least 60 wt. % of potassium acetate;

containing potassium and sodium in a molar ratio of 0.4:1 to 5:1; and a particle size in the range of 40 to 1,000 µm.

Accordingly, a first aspect of the invention relates to a particulate product comprising at least 10 wt. % of these coated acetate particles. The particulate product of the present invention can be provided in the form of a powder that consists of coated acetate particles. Alternatively, the particulate product may be provided in the form of a blend of these coated acetate particles and one or more other particulate ingredients.

The inventors have surprisingly found that the coated acetate particles of the present invention are very stable, even though the highly hygrocopic potassium acetate in the coating layer is in direct contact with the surrounding atmosphere.

Another aspect of the invention relates to a method of preparing a foodstuff or a beverage, said method comprising incorporating the aforementioned particulate product in a concentration of 0.1 to 10 % by weight of the foodstuff or beverage.

Yet another aspect of the invention relates to a process of producing the particulate product of the present invention, said process comprising:

providing a fluidized bed of carrier particles containing at least 80 wt. % of sodium acetate component selected from sodium acetate hydrates, sodium acetate anhydrous and combinations thereof;

spray coating the carrier particles by spraying the fluidized bed with an aqueous liquid containing at least 30 wt. % potassium acetate; and drying the spray coated carrier particles.

DETAILED DESCRIPTION OF THE INVENTION

As already mentioned above, a first aspect of the invention concerns a particulate product comprising at least 10 wt. % of the coated acetate particles having the following characteristics:

comprising one or more carrier particles containing at least 80 wt. % of sodium acetate component selected from sodium acetate hydrates, sodium acetate anhydrous and combinations thereof;

comprising a coating layer that covers the one or more carrier particles, said coating layer containing at least 60 wt. % of potassium acetate;

containing potassium and sodium in a molar ratio of 0.4:1 to 5:1; and a particle size in the range of 40 to 1,000 μm.

The term 'particulate product' as used herein refers to a product that is composed of particles, such as a powder or a granulate.

The term 'sodium acetate' as used herein, unless indicated otherwise, encompasses both hydrates of sodium acetate and anhydrous sodium acetate ($CH_3COONa$).

The term 'potassium acetate' as used herein refers to potassium acetate anhydrous ($CH_3COOK$).

Whenever reference is made herein to 'the coated acetate particles', unless indicated otherwise, what is meant are the coated acetate particles having the characteristics as specified above or of preferred embodiments of these coated acetate particles as specified herein.

Whenever reference is made herein to the particle size of a particle, unless indicated otherwise, this particle size is the particle size measured using laser diffraction (Malvern Mastersizer 2000).

The coated acetate particles of the present invention preferably have a water content of less than 3.5 wt. %, more preferably of less than 3.0 wt. % and most preferably of less than 2.5 wt. %. Whenever reference is made herein to the water content of a material, this is the water content as typically measured by means of the Karl Fischer titration method, including crystal water that is contained in hydrates, such as sodium acetate trihydrate ($C_2H_9NaO_5$).

The water content of the particulate product of the present invention typically is less than 8 wt. %, preferably less than 6 wt. % and more preferably less than 4 wt. %, and most preferably less than 2.5 wt %. Here the water content of the particulate product includes the water that is contained in the coated acetate particles.

In a preferred embodiment, the particulate product contains at least 20 wt. %, more preferably at 50 wt. %, even more preferably at least 80 wt. % and most preferably at least 90 wt. % of the coated acetate particles.

Besides the coated acetate particles, the particulate product may suitably contain one or more other particulate ingredients.

According to a preferred embodiment, the particulate product additionally contains 10-90 wt. % of lactate particles containing at least 80 wt. % of lactate selected from sodium lactate, calcium lactate and combinations thereof. The combination of coated acetate particles, and lactate particles preferably constitutes at least 50 wt. %, more preferably at least 60 wt. % and most preferably at least 70 wt. % of the particulate product.

According to another preferred embodiment, the particulate product additionally contains 10-90 wt. % of propionate particles containing at least 40 wt. % of alkali metal propionate. The combination of coated acetate particles and propionate particles preferably constitutes at least 50 wt. %, more preferably at least 60 wt. % and most preferably at least 70 wt. % of the particulate product.

The coated acetate particles according to the present invention have a particle size in the range of 45 to 900 μm, preferably in the range of 50 to 850 μm, more preferably in the range of 60 to 800 μm.

According to another preferred embodiment, the coated acetate particles have an average diameter D[4,3] in the range of 100 to 800 μm, more preferably in the range of 145 to 700 μm and most preferably in the range of 190 to 650 μm. Here the 'average diameter D[4,3]' refers to the De Brouckere mean diameter or volume mean diameter and can be defined as the weighted average volume, assuming spherical particles of the same volume as the actual particles. This average diameter is calculated by means of the following equation:

$$D[4, 3] = \frac{\sum (n_i D_i^4)}{\sum (n_i D_i^3)}$$

wherein:

$D_i$=mean particle size in size class i;

$n_i$=number of particles in size class i

The particulate product of the present invention preferably has a bulk density in the range of 0.40-0.80 g/ml, more preferably in the range of 0.45-0.75 g/ml and most preferably in the range of 0.50-0.70 g/ml. The term 'bulk density' as used herein refers to the mass of a quantity of the particulate product divided by the total volume that is occupied by said quantity. The total volume includes particle volume, inter-particle void volume, and internal pore volume. The bulk density referred to herein is the "tapped" density, i.e. the bulk density of the product after being mechanically tapped until there are no further changes in volume (nominal count of minimum 180 taps).

The one or more carrier particles within the coated acetate particles preferably contain at least 85 wt. %, more preferably at least 90 wt. % and most preferably at least 92 wt. % of the sodium acetate component.

The sodium acetate component in the carrier particles preferably largely consists of anhydrous sodium acetate. Accordingly, in a preferred embodiment, the one or more carrier particles contain at least 80 wt. %, more preferably at least 85 wt. % and most preferably at least 90 wt. % of anhydrous sodium acetate.

The coating layer of the coated lactate particles preferably contains at least 70 wt. %, more preferably at least 80 wt. % and most preferably at least 90 wt. % of potassium acetate.

The coated acetate particles of the present invention may contain one or more additional coating layers besides the coating layer containing the potassium acetate. The benefits of the present invention, however, are particularly appreciated in case the coated acetate particles contain no additional coating layers.

In another preferred embodiment, potassium and sodium are present in the coated acetate particles in a molar ratio of 0.5:1 to 3:1, even more preferably 0.6:1 to 2:1.

The total amount of sodium in the coated acetate particles is preferably in the range of 10-20 wt. %, more preferably in the range of 11-18 wt. %.

The total amount of potassium in the coated acetate particles is preferably in the range of 15-30 wt. %, more preferably in the range of 17-25 wt. %.

The total amount of acetate in the coated acetate particles is preferably in the range of 55-72 wt. %, more preferably of 60-70 wt. %. Here the 'total amount of acetate' refers to the total amount of acetic acids residue, including the water that is contained in sodium acetate hydrates.

According to a preferred embodiment, the combination of sodium acetate component and potassium acetate constitutes at least 80 wt. %, more preferably at least 90 wt. % and most preferably at least 95 wt. % of the coated acetate particles.

The one or more carrier particles that are contained in the coated acetate particles of the present invention preferably have a particle size in the range of 20-300 μm, more preferably in the range of 30-250 μm, most preferably in the range of 40-200 μm.

According to a particularly preferred embodiment of the present invention, at least 30 wt. %, more preferably at least 40 wt. % and most preferably at least 50 wt. % of the coated acetate particles consists of agglomerated particles comprising at least 2 carrier particles.

Another aspect of the invention relates to a method of preparing a foodstuff or a beverage, said method comprising incorporating a particulate product as defined herein, in a concentration of 0.1 to 10 % by weight, preferably 0.15 to 8% by weight of the foodstuff or the beverage.

The present method preferably comprises the step of distributing the particulate product throughout the foodstuff or of dispersing the particulate product throughout the beverage.

Preferably, the present method comprises incorporating the particulate product in a foodstuff.

According to a particularly preferred embodiment the foodstuff is a meat product, more preferably a processed meat product. Examples of processed meat products include:
- fresh processed meat products (e.g. hamburgers, fried sausage, kebab, chicken nuggets)
- cured meat pieces (e.g. raw cured beef, raw ham, cooked beef, cooked ham, reconstituted products and bacon)
- raw-cooked products (e.g. Frankfurter, mortadella, Lyoner and meat loaf)
- precooked-cooked products (e.g. liver sausage, blood sausage and corned beef)
- raw (dry)-fermented sausages (e.g. salami)
- dried meat Most preferably, the present method is applied in the preparation of a processed meat product selected from cured meat pieces and raw (dry)-fermented sausages.

Yet another aspect of the invention relates to process of producing the particulate product of the present invention, said process comprising:
- providing a fluidized bed of carrier particles containing at least 80 wt. % of sodium acetate component selected from sodium acetate hydrates, sodium acetate anhydrous and combinations thereof;
- spray coating the carrier particles by spraying the fluidized bed with an aqueous liquid containing at least 30 wt. % potassium acetate; and
- drying the spray coated carrier particles.

In a preferred embodiment of the production process, the carrier particles contain at least 85 wt. %, more preferably at least 90 wt. % of sodium acetate component.

In a particularly preferred embodiment of the invention at least 80 wt. %, more preferably at least 90 wt. % of the carrier particles have a particle size in the range of 20-300 μm, more preferably in the range of 30-250 μm, most preferably in the range of 40-200 μm.

The aqueous liquid that is employed in the aqueous process preferably contains at least 40 wt. %, preferably at least 50 wt. % of potassium acetate.

Drying of the spray coated particles is preferably achieved simultaneously with the spray coating by passing a stream of drying gas through the fluidized bed of particles. The drying gas employed is preferably selected from air, oxygen, nitrogen and combinations thereof.

Simultaneous spray coating and drying is preferably carried out using an drying gas temperature in the range of 50-160° C., more preferably in the range of 60-150° C. and most preferably in the range of 70-140° C.

Simultaneous spray coating and drying is preferably carried out at atmospheric or increased pressure, more preferably at a pressure of 1.5-4 bar, most preferably at a pressure of 2-3.5 bar.

The invention is further illustrated by means of the following non-limiting examples.

EXAMPLES

Example 1

Coated acetate particles according to the present invention were prepared in a GLATT® fluid bed dryer as described below.

Sodium acetate powder was prepared by spray drying. The powder so obtained had an average diameter, D[4,3] of 70 μm.

The basket of the fluid bed dryer was filled with 40 kg of the sodium acetate powder. This starting material was heated up to 60° C. during fluidization of the product. Air flow speed was set at 600 m³/h.

A 68% aqueous solution of potassium acetate was used as spraying liquid. The spraying liquid had been prepared by neutralizing vinegar (23%) with potassium hydroxide (50%) to about pH 9.0, followed by evaporation under vacuum to a dry matter content of 68 wt. %.

Spraying was started when the fluidized bed had reached a temperature of 60° C. Air inlet temperature was set at 120° C. while the spray pressure was 3 bar. Initially spray rate was set at around 250 g/min which then was ramped up to 650 g/min over 5 hours of spraying after which the spraying was stopped. The product was cooled to 30° C. for about 20 minutes and collected in aluminum bags.

The properties of the powder so obtained are summarized in Table 1.

TABLE 1

| | |
|---|---|
| Sodium acetate | 48 wt. % |
| Potassium acetate | 50 wt. % |
| Sodium | 14 wt. % |
| Potassium | 20 wt. % |
| Acetate | 65 wt. % |
| Moisture | 2 wt. % |
| Tapped density | 0.55 g/ml |
| D[4, 3] | 630 μm |

SEM-EDX pictures were taken of the powder. These pictures showed that the powder consisted of porous and irregularly shaped particles.

The invention claimed is:

1. A particulate product, comprising at least 10 wt. % of coated acetate particles having a particle size in the range of 40 to 1,000 μm, and comprising:
    (a) one or more carrier particles comprising at least 80 wt. % of a sodium acetate component selected from sodium acetate hydrates, sodium acetate anhydrous and combinations thereof;
    (b) a coating layer that covers the one or more carrier particles, the coating layer comprising at least 60 wt. % of potassium acetate; and
    (c) potassium and sodium in a molar ratio of 0.4:1 to 5:1.

2. The particulate product according to claim 1, wherein the one or more carrier particles comprises at least 90 wt. % of sodium acetate.

3. The particulate product according to claim 1, wherein the coating layer comprises at least 70 wt. % of potassium acetate.

4. The particulate product according to claim 3, wherein the coating layer comprises at least 80 wt. % of potassium acetate.

5. The particulate product according to claim 1, wherein potassium and sodium are present in the coated acetate particles in a molar ratio of 0.5:1 to 3:1.

6. The particulate product according to claim 1, wherein the combination of sodium acetate component and potassium acetate constitutes at least 80 wt. % of the coated acetate particles.

7. The particulate product according to claim 6, wherein the combination of sodium acetate component and potassium acetate constitutes at least 90 wt. % of the coated acetate particles.

8. The particulate product according to claim 1, wherein the coated acetate particles have a water content of less than 3.5 wt. %.

9. The particulate product according to claim 1, comprising at least 30 wt. % of the coated acetate particles.

10. The particulate product according to claim 1, further comprises 10-90 wt. % of lactate particles comprising at least 80 wt. % of lactate selected from sodium lactate, calcium lactate and combinations thereof.

11. The particulate product according to claim 1, further comprises 10-90 wt. % of propionate particles comprising at least 40 wt. % of alkali metal propionate.

12. The particulate product according to claim 1, comprising at least 80 wt. % of the coated acetate particles.

13. The particulate product according to claim 12, comprising at least 90 wt. % of the coated acetate particles.

14. The particulate product according to claim 1, having a bulk density in the range of 0.40-0.80 g/ml.

15. The particulate product according to claim 1, wherein the one or more carrier particles have a particle size in the range of 10 to 300 μm.

16. A method of preparing a foodstuff or a beverage, comprising incorporating a particulate product according to claim 1 in a concentration of 0.1. to 10% by weight of the foodstuff or the beverage.

17. A process of producing a particulate product according to claim 1, comprising:
   (a) providing a fluidized bed of carrier particles comprising at least 80 wt. % of sodium acetate component selected from sodium acetate hydrates, sodium acetate anhydrous and combinations thereof;
   (b) spray coating the carrier particles by spraying a fluidized bed with an aqueous liquid comprising at least 30 wt. % potassium acetate; and
   (c) drying the spray coated carrier particles.

18. The process according to claim 17, wherein the aqueous liquid comprises at least 40 wt. % of potassium acetate.

19. The process according to claim 17, wherein the aqueous liquid comprises at least 50 wt. % of potassium acetate.

* * * * *